United States Patent
Lidster et al.

(10) Patent No.: US 11,576,377 B2
(45) Date of Patent: Feb. 14, 2023

(54) ANTIMICROBIAL MIXTURES OF AN ESSENTIAL OIL DERIVED BACTERICIDE AND AN ESSENTIAL OIL DERIVED FUNGICIDE WHICH EXTEND THE SHELF-LIFE OF PERISHABLE AGRICULTURAL COMMODITIES

(71) Applicants: Perry Lidster, Summerland (CA); Eduardo Cacace, Summerland (CA); Pascal Delaquis, Summerland (CA)

(72) Inventors: Perry Lidster, Summerland (CA); Eduardo Cacace, Summerland (CA); Pascal Delaquis, Summerland (CA)

(73) Assignee: Verséa Holdings Inc., Tampa, FL (US)

( * ) Notice: Subject to any disclaimer, the term of this patent is extended or adjusted under 35 U.S.C. 154(b) by 0 days.

(21) Appl. No.: 14/783,529

(22) PCT Filed: Apr. 10, 2014

(86) PCT No.: PCT/CA2014/000337
§ 371 (c)(1),
(2) Date: Oct. 9, 2015

(87) PCT Pub. No.: WO2014/165969
PCT Pub. Date: Oct. 16, 2014

(65) Prior Publication Data
US 2016/0057998 A1     Mar. 3, 2016

Related U.S. Application Data

(60) Provisional application No. 61/811,152, filed on Apr. 12, 2013.

(51) Int. Cl.
*A01N 31/08* (2006.01)
*A23B 7/154* (2006.01)
(Continued)

(52) U.S. Cl.
CPC ............ *A01N 31/08* (2013.01); *A01N 27/00* (2013.01); *A01N 35/02* (2013.01); *A01N 37/02* (2013.01);
(Continued)

(58) Field of Classification Search
CPC ........ A01N 27/00; A01N 37/02; A01N 47/46; A01N 35/02; A01N 31/08; A01N 65/00;
(Continued)

(56) References Cited

U.S. PATENT DOCUMENTS

2007/0207981 A1* 9/2007 Almenar ............... A01N 25/18
514/58
2008/0131533 A1* 6/2008 Kvitnitsky ............. A01N 65/00
424/739
(Continued)

FOREIGN PATENT DOCUMENTS

EP     1106070 A2     6/2001
EP      843965 A1    12/2002
(Continued)

OTHER PUBLICATIONS

Lopez et al. J Agric. Food Chem. 2005,53,6930-6946.*
(Continued)

*Primary Examiner* — Subbalakshmi Prakash
(74) *Attorney, Agent, or Firm* — Kilpatrick Townsend & Stockton LLP

(57) ABSTRACT

The disclosure provides an antimicrobial mixture of at least two volatile compounds derived from essential oils, at least one of which is a bactericide selected from cinnamaldehyde, diacetyl, and acetic acid with another being a fungicide selected from allyl isothiocyanate, hexanal, thymol, and 2-nonane. The antimicrobial mixture inhibits both bacterial and fungal pathogens that negatively impact the shelf-life of perishable agricultural commodities, and at concentrations (Continued)

sufficiently low to avoid phytotoxic effects to agricultural commodities held in closed shipping and storage systems.

17 Claims, 3 Drawing Sheets

(51) Int. Cl.
    *A01N 35/02*      (2006.01)
    *A01N 47/46*      (2006.01)
    *A01N 27/00*      (2006.01)
    *A01N 37/02*      (2006.01)

(52) U.S. Cl.
    CPC .............. *A01N 47/46* (2013.01); *A23B 7/154* (2013.01); *A23V 2002/00* (2013.01)

(58) Field of Classification Search
    CPC ........ A01N 65/22; A01N 65/24; A01N 37/08; A23B 7/154
    USPC ................. 426/532; 514/515, 557, 693, 701
See application file for complete search history.

(56) References Cited

U.S. PATENT DOCUMENTS

| | | | |
|---|---|---|---|
| 2008/0175965 A1* | 7/2008 | Brander | A23B 4/20 426/335 |
| 2011/0155618 A1* | 6/2011 | Rubino | B65D 81/24 206/524.1 |
| 2012/0252893 A1* | 10/2012 | Pimentel | A01N 31/16 514/557 |

FOREIGN PATENT DOCUMENTS

| | | |
|---|---|---|
| WO | 2011095372 A1 | 8/2011 |
| WO | 2011114347 A2 | 9/2011 |

OTHER PUBLICATIONS

Tzortzakis, N. Essential oils Innovative Tool to Improve the Preservation of Fresh Produce . Fresh produce 3(Specail issue 1) 87-97 Global Science Books 2009.*

Lopez et al. .J. Agric. Food Chem. 2007, 55, 4348-4356 (Year: 2007).*

* cited by examiner

ANTIMICROBIAL MIXTURES OF AN ESSENTIAL OIL DERIVED BACTERICIDE AND AN ESSENTIAL OIL DERIVED FUNGICIDE WHICH EXTEND THE SHELF-LIFE OF PERISHABLE AGRICULTURAL COMMODITIES

CROSS-REFERENCE TO RELATED APPLICATIONS

This application is a national phase entry under 35 U.S.C. § 371 of PCT/CA2014/000337 filed on Apr. 10, 2014, which claims priority to U.S. Provisional Patent Application No. 61/811,152 filed on Apr. 12, 2013, the entirety of each of which is incorporated by this reference.

FIELD OF THE INVENTION

The present invention provides for a antimicrobial mixture which can be used to enhance the shelf-life of perishable goods.

BACKGROUND OF THE INVENTION

Fruit, vegetables and cut-flowers are highly perishable agricultural commodities. Growth of microorganisms including bacteria and fungi can lead to rapid quality deterioration and spoilage after harvest of agricultural commodities, as well as for other raw and processed food materials. The majority of fresh produce destined for shipping is packed in containers that do not provide protection against microbial activity. Consequently, the maintenance of low temperature is essential to reduce the growth of microorganisms during storage and transport. Unfortunately, periodic warming episodes and consequent deterioration in quality and product loss are common in distribution systems.

There are few options available for the control of fungal and bacterial deterioration of fruit, vegetables or flowers in distribution systems. The industry relies on washing with sanitizers or application of antimicrobials before the commodity is placed inside a container to achieve acceptable shelf-life during subsequent handling.

Further, current regulations stipulate that substances incorporated into food from packaging must meet specific regulatory criteria. Therefore, it is more economically viable to use existing products that are generally recognized as safe by the USDA or categorized as flavorings under European regulations.

The only commercial product available to provide antimicrobial function inside containers is a gaseous chlorine dioxide preparation which is released from sachets added prior to closure. The product is not widely used due to the potential for adverse reactions with plant tissues (phytotoxic effects that can lead to changes in colour, texture, or flavour), general concerns about the toxicity of chlorine and incompatibility with regulations governing the production of organic foods.

Essential oils and their extracts contain volatile and complex compounds formed by plants as secondary metabolites. They have been traditionally used for disease and infection treatment for centuries, and have recently been utilized in food preservation. While a great deal of research has been performed to evaluate the effect of direct contact between microorganisms and antimicrobial essential oil compounds, exploration of antimicrobial properties of essential oil vapours phase is relatively new (Tyagi et al. 2012, Trends in Food Science & Technology. Volume 26, Issue 2: 99-113). Studies regarding essential oil vapour phase to-date have been directed towards the efficacy of individual essential oil compounds in liquid and gas phases against microorganisms in food preservation applications (Hyldgaard et al. 2012. Frontiers in Microbiology. 3:1-24.) (Obaidat and Frank, 2009. J. Food Prot. 72:315-324).

Attempts to combine essential oils to provide synergistic effects have been made. U.S. patent application Ser. No. 12/995,122 shows synergistic effects of oil of orange and oil of bergamot, however the ratios of a large number of compounds within essential oils is difficult to control between batches, leading to uncertainty about antimicrobial properties when applied in a commercial setting.

Natural volatile compounds with antimicrobial abilities have been identified from essential oil mixtures. These include allyl isothiocyanate, cinnamaldehyde, hexanal, diacetyl, acetic acid, nonanone and thymol, all of which, alone, are capable of inhibiting either bacteria or fungi, but none is capable of performing both functions at concentrations that are 1) sufficiently low to permit commercial application, or 2) not deleterious to the quality of fresh produce due to phytotoxicity ((Mari et al. 2007. Stewart Postharvest Review, 3(6). Article 4). For example, allyl isothiocyanate causes discoloration of peaches, (Mari et al. 2008. Postharvest Biol. Technol. 47:61-67); oregano and thyme oils induce systemic damage in tomato (Plotio et al, 2003. Acta Hort. 628:737-745), and thymol causes browning of cherry stem (Tsao and Zhou, 2000).

It would be beneficial to provide a natural volatile agent that is generally recognized as safe, and capable of inhibiting both bacteria and fungi common to perishable agricultural commodities at concentrations sufficiently low to permit commercial application and to avoid phytotoxic effects on perishable agricultural commodities held in closed shipping and storage systems.

SUMMARY OF THE INVENTION

The invention provides for an antimicrobial mixture of volatile compounds comprising at least two different compounds selected from volatile compounds derived from essential oils. The antimicrobial mixture is capable of inhibiting bacterial and fungal pathogens in a hermetically sealed container.

An aspect of the invention provides for an antimicrobial mixture of volatile compounds comprising at least two different compounds. At least one of the at least two different compounds is selected from a list consisting of cinnamaldehyde, diacetyl, and acetic acid. At least one of the at least two different compounds is selected from a list consisting of allyl-isothiocyanate, hexanal, thymol, and 2-nonanone. The antimicrobial mixture is capable of inhibiting bacterial and fungal pathogens in a hermetically sealed container.

In an aspect of the invention, the antimicrobial mixture of volatile compounds exists in either a liquid or solid phase.

In another aspect of the invention, the antimicrobial mixture of volatile compounds exists in vapour phase.

In an aspect of the invention, the antimicrobial mixture is applied at a concentration that is not phytotoxic to agricultural commodities.

BRIEF DESCRIPTION OF THE DRAWINGS

A detailed description of the preferred embodiments is provided herein below by way of example only and with reference to the following drawings, in which.

Figure 1:
FIG. 1 is top view of a model system used to test antifungal activity of essential oil mixtures.

In the drawings, preferred embodiments of the invention are illustrated by way of example. It is to be expressly understood that the description and drawings are only for the purpose of illustration and as an aid to understanding, and are net intended as a definition of the limits of the invention.

DETAILED DESCRIPTION

Spoilage of perishable agricultural commodities due to bacterial and fungal growth within closed containers is a persistent problem. Various volatile antimicrobial compounds have been utilized to mitigate growth of pathogens within agricultural commodity shipping containers, however, at present there are few suitable solutions that are capable of inhibiting both bacterial and fungal growth in tandem, at concentrations that are 1) sufficiently low to permit commercial application, or 2) not deleterious to the quality of fresh produce due to phytotoxicity.

The present invention provides an antimicrobial mixture of volatile compounds comprising at least two different compounds selected from volatile compounds derived from essential oils. The antimicrobial mixture is capable of inhibiting bacterial and fungal pathogens in a hermetically sealed container.

An antimicrobial mixture refers to a mixture capable of inhibiting, reducing the growth rate of, or killing microbial pathogens. Microbial pathogens may include bacteria, fungus, or yeast. More specifically, an antimicrobial mixture is capable of inhibiting bacteria or fungus. Bacteria may include grain positive or gram negative bacteria strains including but not limited to *Listeria* spp., *Staphylococcus aureus, Escherichia coli, Salmonella* spp. and *Erwinia carotovorum*.

Fungal strains which are inhibited by the antimicrobial mixtures of volatile compounds may comprise black, white and green fungal colonies. More specifically, fungal colonies susceptible to the inhibitory activity of the antimicrobial mixture of volatile natural, compounds may include *Geotrichum candidum, Alternaria alternata, Rhizopus stolonifer, Botrytis cinerea, Penicillium olsonil, Cladosporium* sp.

The volatile compounds can transition from liquid to vapour phase at ambient temperature in a closed system. In another aspect of the invention, the binary mixture of volatile natural compounds can transition from liquid to vapour phase at temperatures above 0° C. Preferably, the compounds transition front liquid to gas phase at temperatures between 0° C. and 30° C.

The compounds comprised by the antimicrobial mixture are compounds derived from essential oils. Essential oil compounds are a diverse family of low molecular weight organic compounds with large differences in antimicrobial activity and minimum inhibitory concentrations at which they display antimicrobial activity. The essential oil compounds may be selected from the chemical families of terpenes, terpenoids, phenylpropenes, volatile organic acids and others essential oil compounds.

More preferably, the essential oil compounds can be selected from a list comprising cinnamaldehyde, diacetyl, acetic acid, allyl-isothiocyanate, hexanal, thymol, and 2-nonanone. For the purpose of this disclosure, essential oil compounds may also include derivatives of compounds found in essential oils.

The antimicrobial mixture of volatile compounds comprises at least two different compounds. Preferably, at least one of the at least two different compounds is selected from a list consisting of cinnamaldehyde, diacetyl, and acetic acid, and least on of the at least two different compounds is selected from a list consisting of allyl isothiocyanate, hexanal, thymol, and 2-nonanone.

The antimicrobial mixture of volatile compounds may be a binary mixture.

Embodiments of the antimicrobial mixture of volatile compounds may comprise combinations of hexanal and cinnamaldehyde, hexanal and acetic acid, hexanal and diacetyl, 2-nonanone and cinnamaldehyde, 2-nonanone and acetic acid, allyl isothiocyanate and acetic acid, allyl isothiocyanate and cinnamaldehyde, allyl isothiocyanate and diacetyl, thymol and acetic acid, or thymol and cinnamaldehyde.

In these embodiments, ranges of concentrations of the antimicrobial mixture of volatile compounds are preferably as illustrated in Table 1:

TABLE 1

Preferred concentration ranges of an embodiment of the invention comprising binary antimicrobial mixtures of volatile compounds derived from essential oils.

| Compounds | Concentration Ranges (ppm) |
| --- | --- |
| hexanal/cinnamaldehyde | 2-25/20-210 |
| hexanal/acetic acid | 2-25/2-36 |
| hexanal/diacetyl | 2-25/1.0-22 |
| 2-nonanone/cinnamaldehyde | 10-200/20-210 |
| 2-nonanone/acetic acid | 10-200/2-36 |
| AIT/acetic acid | 0.2-2.0/2-36 |
| AIT/cinnamaldehyde | 0.2-2.0/20-210 |
| AIT/diacetyl | 0.2-2.0/1.0-22 |
| thymol/acetic acid | 3-30/2-36 |
| thymol/cinnamaldehyde | 3-30/20-210 |

In an embodiment of the invention, the antimicrobial mixture of volatile compounds comprising at least two different compounds are selected from antimicrobial volatile compounds derived from essential oils. Each of the antimicrobial compounds in the mixture exists at a concentration range below the minimum inhibitory concentration required for the compound to inhibit both bacterial and fungal pathogens in the absence of the other components of the antimicrobial mixture. For better understanding, each of the antimicrobial compounds, in the mixture exists at a concentration range below the minimum inhibitory concentration required for the compound in a homogeneous mixture to inhibit both bacterial and fungal pathogens. The combination of the at least two compounds in a mixture provides for the capability of inhibiting bacterial and fungal pathogens in a hermetically sealed container. The antimicrobial mixture of volatile compounds may also inhibit other microbial pathogens such as yeast.

The volatile essential oil compounds which the antimicrobial mixture comprises may provide heterogeneous activity relative to one another. The combining of compounds into heterogeneous mixtures provide the unexpected result of an antimicrobial mixture of volatile natural compounds which can be applied at diluted concentrations compared to the minimum inhibitory concentrations of each individual volatile compound required to inhibit bacterial and fungal pathogens when present in a homogeneous solution. This may be due to the combination of the different modes of inhibitory action of the two or more volatile natural compounds. This result allows for the compounds to be applied in a mixture at concentrations that are sufficiently low to permit commercial application, and not deleterious to the quality of perishable agricultural commodities due to phytotoxicity.

As an example, the vapour phase concentration of a homogenous cinnamaldehyde mixture or a homogenous 2-nonanone mixture required to inhibit both bacteria and fungus would impart significant phytotoxic effects on agricultural commodities within a hermetically sealed container. However, these compounds can be mixed to provide a vapour phase concentration of each capable of inhibiting both bacteria and fungus but having limited phytotoxic effects on agricultural commodities.

Phytotoxic effects of individual compounds in homogenous mixtures, at vapour phase concentrations sufficient to inhibit both bacteria and fungus may include discoloration, browning, systemic damage, dehydration, and other effects that negatively impact the nutritional composition, texture, organoleptic properties such as taste, smell and visual attractiveness, and general saleability of the products contained within the hermetically sealed container. Damaged tissues due to phytotoxic materials could also lead to greater susceptibility to decay.

The antimicrobial mixture of volatile compounds may comprise a ternary or quaternary mixture, or a mixture of a greater amount of essential oil compounds or derivatives of essential oil compounds. Examples of antimicrobial mixtures of volatile compounds with greater than two different compounds may comprise hexanal, cinnamaldehyde, and diacetyl, or thymol, acetic acid and cinnamaldehyde.

The antimicrobial mixture of volatile compounds may further comprise other non-active ingredients and adjuvants.

The antimicrobial mixture of volatile compounds may be carried or contained in a range of inert carriers. The carrier must allow for the compounds to be released from the carrier when the compounds transition to vapour phase. The antimicrobial mixture of volatile compounds may be contained in as permeable cases or sacks. In one embodiment of the invention, the volatile compounds are contained within a permeable sachet. Carriers may comprise a moistened piece of absorbent material. Further, a carrier may be any means of transporting the volatile compounds of the antimicrobial mixture to a hermetically sealed container which allows for release of the vapour phase compounds throughout the interior of the container.

In an embodiment of the invention, the at least two different compounds derived from essential oils making up the antimicrobial mixture are each carried or contained on separate carriers. When in use, the carriers containing the compounds are placed in a hermetically sealed container allowing for release of the volatile compounds into the closed system once they have entered the vapour phase. The vapour phase compounds comprise the antimicrobial mixture of volatile compounds capable of inhibiting microbial pathogens in a hermetically sealed container.

The antimicrobial mixture of volatile compounds may be input directly into a hermetically sealed container in the absence of a carrier.

The presence of the antimicrobial mixture of volatile compounds is beneficial during transportation, ambient storage and refrigerated storage as well as under conditions where the refrigeration chain has been disrupted.

The hermetically sealed container minimizes exchange of gas between inside the container and the outside atmosphere allowing for the vapour phase volatile compounds to remain in the interior atmosphere of the package and contribute to the inhibition of bacteria and fungi thereby extending the shelf-life of perishable contents within the container. The hermetically sealed container may be covered to decrease the exchange of vapour from inside to outside the container and from outside to inside the container relative to an open container, or may be sealed to completely eliminate the exchange of gas from inside to outside the container and from outside to inside the container. As an example, the hermetically sealed container may comprise the containers described in U.S. Pat. Nos. 6,880,748 and 7,597,240. The antimicrobial mixture of volatile compounds is at a concentration which provides minimal phytotoxic effects to plants when enclosed in a hermetically sealed system with perishable contents.

Perishable contents may comprise agricultural commidities and other plant matter. Agricultural commidities include fruit, vegetables, cut flowers, grains, pulses, ornamental plants such as shrubs or seedlings, horticultural and ornamental products or other perishable agricultural commodities. Further, the antimicrobial mixtures could find use in the preservation of a wide range of foods or other perishable goods that are distributed in hermetically sealed containers, either alone or in tandem with modified or controlled atmospheres. As such, perishable contents may include foods. Foods may include baked goods, meats, seafood, and other consumable food products. While the antimicrobial mixture of volatile compounds inhibits fungal and bacterial pathogens and has limited phytotoxic effects, the mixture also may be considered safer and require less product testing to be accepted by government regulatory bodies than conventional synthetic chemical products. As such, perishable contents which would benefit from the antimicrobial mixture of volatile compounds within the hermetically sealed system may be any product on which or within which bacteria and fungus is capable of growing. This may include foods, fabrics, textiles, and other goods.

The antimicrobial mixture of volatile compounds may be applied to the closed system by any means of inserting the antimicrobial mixture into the closed system. Means of inserting the antimicrobial mixture of volatile natural compounds into the closed system may be addition of an absorbent material containing the antimicrobial mixture, spraying the antimicrobial mixture of volatile natural compounds, addition of a sachet comprised of an absorbent material moistened with the antimicrobial mixture of volatile natural compounds or each compound separately, or other means currently known in the art.

The compounds derived from essential oils which make up the antimicrobial mixture of volatile compounds may be produced through extraction of essential oils from plants. Numerous methods of extraction of essential oils from plants are known in the art. One such method includes steam distillation. Specific compounds may be separated from the essential oils by way of fractional distillation or other fractionation processes known in the art.

The compounds can be input into a hermetically sealed container either separately, or mixed. When placed in the hermetically sealed container, the volatile compounds transfer from either solid or liquid to vapour phase over time where they form an antimicrobial vapour mixture. In vapour phase, the antimicrobial mixture exerts antimicrobial activity an both bacterial and fungal pathogens within the container. Once in vapour phase, the antimicrobial mixture of volatile compounds is present throughout the airspace within the container, remaining at or greater than the minimum inhibitory concentration in the container for a sufficient period of time to exert antimicrobial activity on bacteria and fungus in the hermetically sealed container. Once the volatile compounds transitions from either solid or liquid to vapour phase, the volatile compounds form an antimicrobial mixture of volatile compounds in vapour phase within the hermetically sealed container. In vapour phase, the antimicrobial mixture exerts antimicrobial activity on both bacterial and fungal pathogens within the container. The vapour phase antimicrobial mixture is at a concentration that has limited phytotoxic effect on perishable contents within the hermetically sealed container. The antimicrobial mixture of volatile compounds inhibits bacteria and fungus in a hermetically sealed container, prolonging the shelf-life of perishable contents within the container. This allows for perishable contents to be shipped or stored for longer periods of time with decreased bacterial and fungal growth, as well as limited phytotoxic effects of the antimicrobial mixture of volatile compounds on the perishable contents.

An embodiment of the invention is a system for prolonging the shelf life of perishable goods comprising a hermetically sealed container having an interior compartment for storage of perishable goods. The flow of gas minimized between the interior compartment and the environment outside of the container. The hermetically sealed container contains at least one perishable good it its interior compartment. The hermetically sealed container also contains an antimicrobial mixture of volatile compounds comprising at least two different compounds selected from antimicrobial volatile compounds derived from essential oils in the interior compartment, the antimicrobial mixture of volatile compounds is capable of reaching and sustaining a vapour phase concentration within the interior compartment for a period of time sufficient to inhibit both bacteria and fungus in the interior compartment. The concentration of the antimicrobial mixture of volatile compounds may have a concentration that has minimal phytotoxic effects on the at least one perishable good in the interior compartment.

EXAMPLES

Example 1

We have considered the activity of each compound in the gas phase against each class of microorganism at the ranges shown in Table 2. This information was used to prepare mixtures of the compounds designed to inhibit both bacteria and fungi at concentrations that render them applicable to the purpose of shelf-life extension of fresh produce inside hermetically sealed containers.

TABLE 2

Concentration ranges of antimicrobial compounds selected for the formulation of binary mixtures with effect against both bacteria and fungi.

| Antimicrobial compounds | Concentration Ranges (ppm) |
|---|---|
| Bactericides | |
| Cinnamaldehyde | 20-210 |
| Diacetyl | 1-22 |
| acetic acid | 2-36 |
| Fungicides | |
| allyl isothiocyanate | 0.2-2.0 |
| Hexanal | 2-25 |
| Thymol | 3-30 |
| 2-nonanone | 10-200 |

The efficacy of the mixtures is measured in a model system consisting of square Mason glass jars (2-litre) fitted with ceramic-lined lids (FIG. 1). Fungal spores or bacteria are applied to the surface of agar disks cut from agar blocks 5 mm thick with a sterile cork borer (13 mm i.d.). Four rows of disks are placed on a glass plate for each experimental trial. Fungal spore or bacterial suspensions are serially diluted and 20 μl of each dilution are placed on the surface of separate agar disks to achieve densities ranging $10^0$ to $10^7$ spores or bacteria/$cm^2$. The glass plates are inserted in the jars, the mixtures are added, the lids are tightly closed and the jars are placed in an incubator. Concentrations are calculated assuming complete vaporization of the compounds and a constant jar volume of 2 litres.

The glass plates are removed from the jars after a fixed incubation time and the disks are examined for evidence of spore germination or bacterial growth (visible colonies). Numbers are recorded for the disk inoculated with the lowest dilution where germination or growth is evident. Disks where there is no evidence of growth are removed from the glass plates with a sterile spatula and placed on the surface of a fresh petri plate. The disks are returned to the incubator and incubated hi the absence of the mixtures for 24 h, and counts are performed as before. Reductions in the number spores or bacteria due to inhibition (after incubation with the mixture) or to lethal effects (after 24 h of recovery in the absence of the mixture) are determined from the difference between controls and the treatments. Results are expressed as an index of inhibition (log number inhibited/$cm^2$) and a lethality index (log number killed/$cm^2$).

Optimization techniques were used to determine mixture formulations, and the minimum and optimum concentrations of volatile mixtures required to achieve both actions against fungi (*Penicillium expansum, Botrytis cinerea*), Gram-negative ((*Escherichia coli, Erwinia carotovorum*) and Gram-positive (*Listeria innocua, Staphylococcus aureus*) bacteria in the model system. The binary mixtures shown in Table 3 were found to inhibit both fungal and bacterial species over the range of concentrations given. Some examples of optimized mixtures are provided in Table 4.

TABLE 3

Range of concentrations of binary mixtures of antimicrobial compounds shown to inhibit bacteria and fungi.

| Compounds | Concentration Ranges (ppm) |
|---|---|
| hexanal/cinnamaldehyde | 2-25/20-210 |
| hexanal/acetic acid | 2-25/2-36 |
| hexanal/diacetyl | 2-25/1.0-22 |
| 2-nonanone/cinnamaldehyde | 10-200/20-210 |
| 2-nonanone/acetic acid | 10-200/2-36 |
| AIT/acetic acid | 0.2-2.0/2-36 |
| AIT/cinnamaldehyde | 0.2-2.0/20-210 |
| AIT/diacetyl | 0.2-2.0/1.0-22 |
| thymol/acetic acid | 3-30/2-36 |
| thymol/cinnamaldehyde | 3-30/20-210 |

TABLE 4

Binary mixtures of antimicrobials tested against six fungi and three human pathogens.

| Antimicrobial Mixture | Antimicrobial compounds |
|---|---|
| A | hexanal/cinnamaldehyde |
| B | thymol/acetic acid |
| C | AIT/diacetyl |

TABLE 4-continued

Binary mixtures of antimicrobials tested against
six fungi and three human pathogens.

| Antimicrobial Mixture | Antimicrobial compounds |
|---|---|
| D | hexanal/diacetyl |
| E | AIT/cinnamaldehyde |
| F | AIT/acetic acid |

Example 2

Control of Fungal Agents Responsible for Storage Defects and of Human Pathogens in Tomatoes Using Binary Mixtures of Volatile Antimicrobials Visual defects caused by the growth of fungi commonly appear during the storage of tomatoes. These may manifest themselves as white, black or green fungal colonies on the skin or in the stem area caused by several fungal species including: *Geotrichum candidum. Alternaria* alternata, *Rhizopus stolonifer, Botrytis cinerea, Penicillium olsonii* and *Cladosporium* sp. Furthermore, human pathogens are known to occasionally contaminate fresh produce leading to outbreaks of illness or recalls of products from the marketplace. *Salmonella* spp, and *Escherichia coli* O157:H7 are the primary human pathogens associated food safety risks in fresh produce, and there is concern that the cold tolerant bacterium *Listeria monocytogenes* could survive and grow during the distribution of produce through commercial cold chains.

We measured the antifungal properties of the six binary mixtures given in Table 4 against the six fungal species on the surface of Potato Dextrose Agar agar in the model system. Table 5 shows that all the binary mixtures inhibited germination of spores from all species with the exception of mixture B, which had little effect against *Geotrichum candidum* and slightly lesser activity against *Rhizopus stolonifer*. The lack of germination upon incubation after removal of the mixtures is indicative of mycosporicidal activity.

TABLE 5

Antifungal activity of six antimicrobial mixtures
against six fungi isolated from tomato at 12° C.

| Antimicrobial Mixture | Fungal species | Lethality Index (log cfu/cm²) | Inhibition Index (log cfu/cm²) |
|---|---|---|---|
| A | Alternaria alternata | 3.77 | 3.77 |
| A | Penicillium olsonii | 4.40 | 4.40 |
| A | Botrytis cinerea | 2.26 | 2.26 |
| A | Cladosporium species | 4.13 | 4.13 |
| A | Rhizopus stolonifer | 4.52 | 4.52 |
| A | Geotrichum candidum | 4.75 | 4.75 |
| B | Alternaria alternata | 3.77 | 3.77 |
| B | Penicillium olsonii | 4.40 | 4.40 |
| B | Botrytis cinerea | 2.26 | 2.26 |
| B | Cladosporium species | 4.13 | 4.13 |
| B | Rhizopus stolonifer | 2.26 | 4.52 |
| B | Geotrichum candidum | 0.00 | 0.00 |
| C | Alternaria alternata | 3.77 | 3.77 |

TABLE 5-continued

Antifungal activity of six antimicrobial mixtures
against six fungi isolated from tomato at 12° C.

| Antimicrobial Mixture | Fungal species | Lethality Index (log cfu/cm²) | Inhibition Index (log cfu/cm²) |
|---|---|---|---|
| C | Penicillium olsonii | 4.40 | 4.40 |
| C | Botrytis cinerea | 2.26 | 2.26 |
| C | Cladosporium species | 4.13 | 4.13 |
| C | Rhizopus stolonifer | 4.52 | 4.52 |
| C | Geotrichum candidum | 4.75 | 4.75 |
| D | Alternaria alternata | 3.77 | 3.77 |
| D | Penicillium olsonii | 4.40 | 4.40 |
| D | Botrytis cinerea | 2.26 | 2.26 |
| D | Cladosporium species | 4.13 | 4.13 |
| D | Rhizopus stolonifer | 4.52 | 4.52 |
| D | Geotrichum candidum | 4.75 | 4.75 |
| E | Alternaria alternata | 3.77 | 3.77 |
| E | Penicillium olsonii | 4.40 | 4.40 |
| E | Botrytis cinerea | 2.26 | 2.26 |
| E | Cladosporium species | 4.13 | 4.13 |
| E | Rhizopus stolonifer | 4.52 | 4.52 |
| E | Geotrichum candidum | 4.75 | 4.75 |
| F | Alternaria alternata | 3.77 | 3.77 |
| F | Penicillium olsonii | 4.40 | 4.40 |
| F | Botrytis cinerea | 2.26 | 2.26 |
| F | Cladosporium species | 4.13 | 4.13 |
| F | Rhizopus stolonifer | 4.52 | 4.52 |
| F | Geotrichum candidum | 4.75 | 4.75 |

We measured the antibacterial properties of the six binary mixtures given in Table 4 against three human pathogens on the surface of Tryptic Soy Agar agar in the model system. The antibacterial activity of the six binary mixtures is shown in Table 6. Each mixture was shown to inhibit the growth of the Grain-positive species *Listeria monocytogenes* and the Gram-negative *Salmonella* spp. and *Escherichia coli* O157: H7. In addition, exposure to the mixture was lethal to all test strains although the magnitude of the effect was lower with mixture F.

TABLE 6

Antibacterial activity of six antimicrobial mixtures
against several isolates of *Salmonella*, *Listeria monocytogenes*
and *E. coli* O157:H7 at 12° C.

| Antimicrobial Mixture | Bacterial species | Lethality Index (log cfu/cm²) | Inhibition Index (log cfu/cm²) |
|---|---|---|---|
| A | E. coli O157:H7, 1 | 5.5 | 5.5 |
| A | E. coli O157:H7, 2 | 5.6 | 5.6 |
| A | E. coli O157:H7, 3 | 5.5 | 5.5 |
| A | L. monocytogenes, 1 | 6.5 | 6.5 |
| A | L. monocytogenes, 2 | 5.6 | 5.6 |
| A | L. monocytogenes, 3 | 5.6 | 4.0 |
| A | Salmonella spp., 1 | 5.6 | 5.6 |
| A | Salmonella spp., 2 | 5.0 | 0.0 |
| B | E. coli O157:H7, 1 | 5.5 | 5.5 |
| B | E. coli O157:H7, 2 | 4.6 | 4.6 |
| B | E. coli O157:H7, 3 | 4.5 | 4.5 |
| B | L. monocytogenes, 1 | 6.5 | 6.5 |
| B | L. monocytogenes, 2 | 5.6 | 5.6 |
| B | L. monocytogenes, 3 | 5.6 | 4.0 |
| B | Salmonella spp., 1 | 5.6 | 5.6 |
| B | Salmonella spp., 2 | 5.0 | 0.0 |
| C | E. coli O157:H7, 1 | 5.8 | 5.8 |
| C | E. coli O157:H7, 2 | 5.5 | 5.5 |
| C | E. coli O157:H7, 3 | 5.0 | 4.0 |
| C | L. monocytogenes, 1 | 5.9 | 5.9 |
| C | L. monocytogenes, 2 | 5.8 | 5.8 |
| C | L. monocytogenes, 3 | 6.0 | 6.0 |
| C | Salmonella spp., 1 | 5.4 | 5.4 |
| C | Salmonella spp., 2 | 5.5 | 4.0 |

TABLE 6-continued

Antibacterial activity of six antimicrobial mixtures against several isolates of Salmonella, Listeria monocytogenes and E. coli O157:H7 at 12° C.

| Antimicrobial Mixture | Bacterial species | Lethality Index (log cfu/cm$^2$) | Inhibition Index (log cfu/cm$^2$) |
|---|---|---|---|
| D | E. coli O157:H7, 1 | 5.8 | 5.8 |
| D | E. coli O157:H7, 2 | 5.5 | 5.5 |
| D | E. coli O157:H7, 3 | 4.0 | 3.0 |
| D | L. monocytogenes, 1 | 6.9 | 6.9 |
| D | L. monocytogenes, 2 | 5.8 | 5.8 |
| D | L. monocytogenes, 3 | 6.0 | 6.0 |
| D | Salmonella spp., 1 | 5.4 | 5.4 |
| D | Salmonella spp., 2 | 4.5 | 3.0 |
| E | E. coli O157:H7, 1 | 5.6 | 5.6 |
| E | E. coli O157:H7, 2 | 5.0 | 5.0 |
| E | E. coli O157:H7, 3 | 5.7 | 5.7 |
| E | L. monocytogenes, 1 | 5.4 | 5.4 |
| E | L. monocytogenes, 2 | 5.0 | 5.0 |
| E | L. monocytogenes, 3 | 5.8 | 5.8 |
| E | Salmonella spp., 1 | 5.5 | 5.5 |
| E | Salmonella spp., 2 | 5.0 | 3.0 |
| F | E. coli O157:H7, 1 | 5.6 | 2.6 |
| F | E. coli O157:H7, 2 | 0.0 | 4.0 |
| F | E. coli O157:H7, 3 | 0.2 | 4.7 |
| F | L. monocytogenes, 1 | 2.4 | 4.4 |
| F | L. monocytogenes, 2 | 3.0 | 4.0 |
| F | L. monocytogenes, 3 | 2.8 | 4.8 |
| F | Salmonella spp., 1 | 2.5 | 4.5 |
| F | Salmonella spp., 2 | 4.0 | 2.0 |

Figure 2:
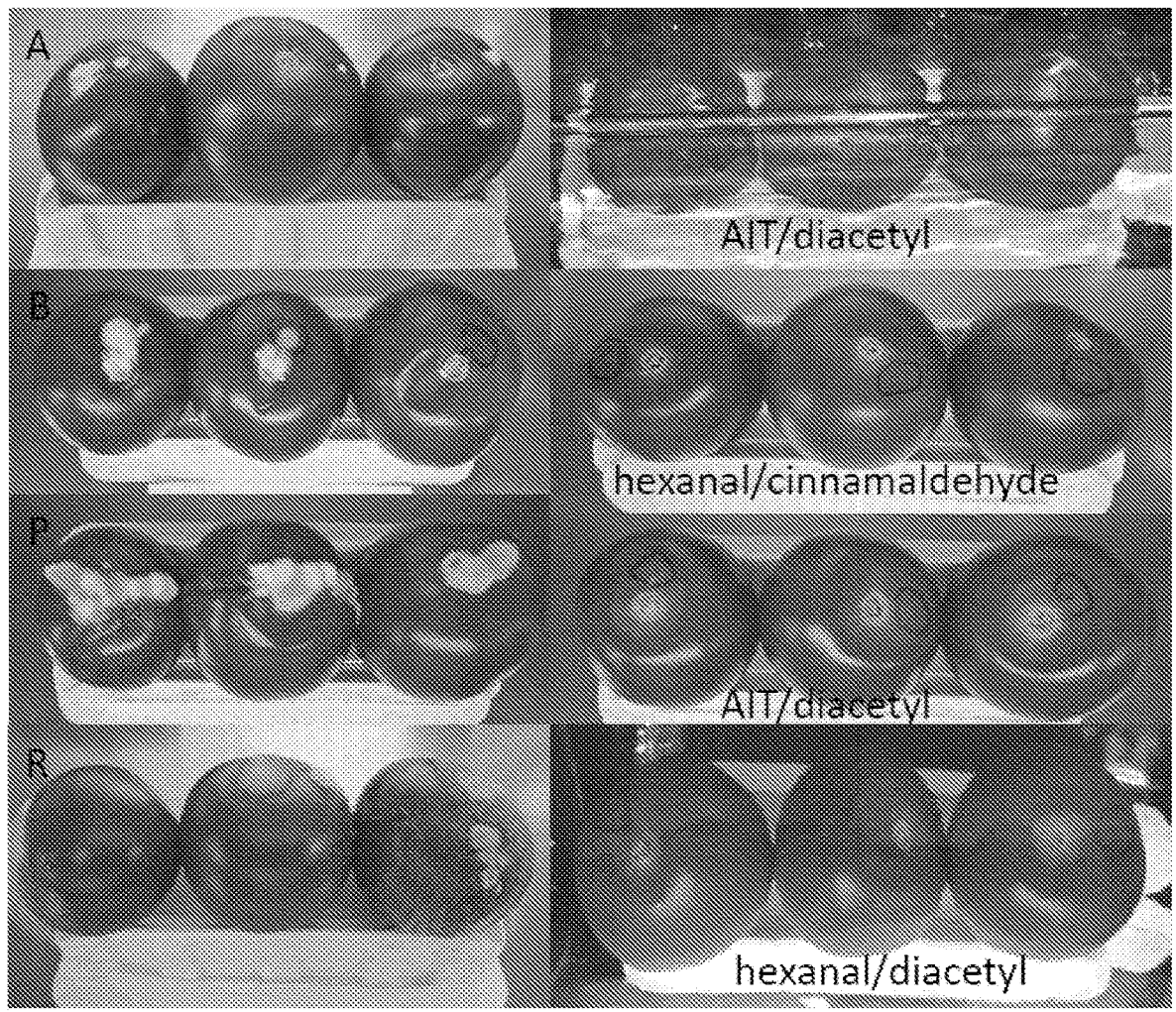
FIG. 2 is a perspective view of tomatoes with and without treatment by an embodiment of the invention.

We verified the ability of binary antimicrobial mixtures to prevent the growth of fungi on cherry tomatoes. Three tomatoes were inoculated by direct addition of spore suspension of *Alternaria alternata*, *Rhizopus stolonifer*, *Penicillium olsonii* or *Botrytis cinerea* to the stem scar, undamaged skin and skin punctured with a needle. The tomatoes were inserted in 2 L Mason jars together with antimicrobial mixtures A, C or D. The jars were stored at 4° C. and 12° C., and the tomatoes were examined for evidence of fungal growth daily. Table 7 summarizes observations and the appearance of the tomatoes is illustrated in FIG. 2. Mixtures C and D clearly delayed the appearance of mycelial growth in all inoculated sites and at both temperatures for the duration of the trial. The appearance of the tomatoes was unchanged by exposure to the antimicrobials released in the headspace of the container.

TABLE 7

Effect of antimicrobial mixtures A, C and D on the growth of four fungi on the skin, in a puncture wound and stem scar of cherry tomatoes. Three tomatoes were examined for each treatment combination. Results were recorded after 20 days of incubation at 4° C. and 15 days 12° C.

| | 4° C. | | | | | | | | | 12° C. | | | | | | | | |
|---|---|---|---|---|---|---|---|---|---|---|---|---|---|---|---|---|---|---|
| | Scar | | | Skin | | | Puncture | | | Scar | | | Skin | | | Puncture | | |
| Tomato | 1 | 2 | 3 | 1 | 2 | 3 | 1 | 2 | 3 | 1 | 2 | 3 | 1 | 2 | 3 | 1 | 2 | 3 |
| *A. alternata* | | | | | | | | | | | | | | | | | | |
| Control | + | + | + | − | − | − | + | + | + | + | + | + | − | − | − | + | + | + |
| A | − | − | − | − | − | − | + | − | − | − | − | − | − | − | − | + | + | + |
| C | − | − | − | − | − | − | − | − | − | − | − | − | − | − | − | − | − | − |
| D | − | − | − | − | − | − | − | − | − | − | − | − | − | − | − | − | − | − |
| *R. stolonifer* | | | | | | | | | | | | | | | | | | |
| Control | + | + | + | + | + | − | − | − | − | + | + | + | − | − | − | + | + | + |
| A | − | − | − | − | − | − | − | − | − | + | + | + | − | − | − | + | + | − |
| C | − | − | − | − | − | − | − | − | − | − | − | − | − | − | − | − | − | − |
| D | − | − | − | − | − | − | − | − | − | − | − | − | − | − | − | − | − | − |
| *P. expansum* | | | | | | | | | | | | | | | | | | |
| Control | + | + | + | − | − | − | + | + | + | + | + | + | − | − | − | + | + | + |
| A | − | − | − | − | − | − | − | − | − | + | + | − | − | − | − | + | + | − |
| C | − | − | − | − | − | − | − | − | − | − | − | − | − | − | − | − | − | − |
| D | − | − | − | − | − | − | − | − | − | − | − | − | − | − | − | − | − | − |
| *B. cinerea* | | | | | | | | | | | | | | | | | | |
| Control | − | − | − | − | − | − | + | + | + | + | + | + | − | − | − | + | + | + |
| A | − | − | − | − | − | − | − | − | − | − | − | − | − | − | − | − | − | − |
| C | − | − | − | − | − | − | − | − | − | − | − | − | − | − | − | − | − | − |
| D | − | − | − | − | − | − | − | − | − | − | − | − | − | − | − | − | − | − |

+: fungal mycelium clearly visible;
−: no evidence of fungal growth.

We verified the ability of binary antimicrobial mixtures to inhibit the human pathogens *Salmonella* spp, and *Escherichia coli* O157:H7 on cherry tomatoes. Three tomatoes were inoculated by direct addition of cells to the skin and in the stem scar of three cherry tomatoes. The tomatoes were inserted in 2 L Mason jars together with antimicrobial mixtures A, C or D. The jars were stored at 4° C. and 12° C., and the tomatoes were analysed for the presence of the pathogens after six days at both temperatures. Enrichment was also performed to allow detection of surviving cells below the limit of detection afforded by the plating assay. Results presented in Table 8 show that all the mixtures could inactivate *Salmonella* spp. and *Escherichia coli* O157:H7 on the skin and in the stem scar of the tomatoes. Mixtures C and D were more effective.

TABLE 8

Effect of antimicrobial mixtures A, C and D on the fate of *Salmonella* and *E. coli* O157:H7 on the skin and in the stem scar of cherry tomatoes stored for 6 days 4° C. at 12° C.

| | 4° C. | | | | | | 12° C. | | | | | |
|---|---|---|---|---|---|---|---|---|---|---|---|---|
| | Scar Log cfu/sample | | | Skin Log cfu/cm$^2$ | | | Scar Log cfu/sample | | | Skin Log cfu/cm$^3$ | | |
| Tomato | 1 | 2 | 3 | 1 | 2 | 3 | 1 | 2 | 3 | 1 | 2 | 3 |
| *E. coli* O157:H7 | | | | | | | | | | | | |
| Control | 4.6 | 4.2 | 5.1 | 1.8 | 2.7 | 2.9 | 5.6 | 5.7 | 5.2 | 2.5 | 2.0 | 1.9 |
| Mixture A | 3.9 | 3.6 | 3.8 | <1 | <1 | <1 | 4.9 | 2.8 | 4.8 | <1 | <1 | <1 |
| Enrichment | + | + | + | − | − | − | + | + | + | + | − | + |
| Control | 4.2 | 4.4 | 3.9 | <1 | <1 | 1.3 | 5.0 | 4.0 | 5.2 | 1.0 | 1.1 | 1.6 |
| Mixture C | <1 | <1 | <1 | <1 | <1 | <1 | <1 | <1 | <1 | <1 | <1 | <1 |
| Enrichment | − | + | + | − | − | − | − | − | − | − | − | − |
| Control | 3.6 | 3.8 | 4.4 | <1 | <1 | <1 | 4.6 | 5.1 | 4.8 | 3.5 | 3.6 | 3.3 |
| Mixture D | <1 | <1 | <1 | <1 | <1 | <1 | <1 | <1 | <1 | <1 | <1 | <1 |
| Enrichment | + | + | − | − | − | − | − | + | + | − | − | − |
| *Salmonella* | | | | | | | | | | | | |
| Control | 4.9 | 4.6 | 4.8 | 3.6 | 1.8 | 2.9 | 5.3 | 5.2 | 4.4 | 4.0 | 3.8 | 3.8 |
| Mixture A | 4.9 | 5.1 | <1 | <1 | <1 | <1 | 4.0 | 4.2 | 4.7 | <1 | <1 | <1 |
| Enrichment | + | + | − | − | + | − | + | + | + | − | − | − |
| Control | 4.6 | 4.7 | 4.0 | 2.3 | 2.2 | 2.3 | 5.1 | 4.6 | 4.9 | 3.4 | 3.1 | 3.7 |
| Mixture C | <1 | <1 | <1 | <1 | <1 | <1 | <1 | <1 | <1 | <1 | <1 | <1 |
| Enrichment | − | − | − | − | − | + | − | − | − | − | − | − |
| Control | 4.0 | 3.9 | 4.3 | 2.5 | 2.8 | 2.6 | 6.2 | 4.1 | 6.0 | 2.6 | 2.2 | 3.5 |
| Mixture D | <1 | <1 | <1 | <1 | <1 | <1 | <1 | <1 | <1 | <1 | <1 | <1 |
| Enrichment | − | − | − | − | − | − | − | − | − | − | − | − |

+: test species detected by enrichment;
−: test species not detected by enrichment.

Figure 3:
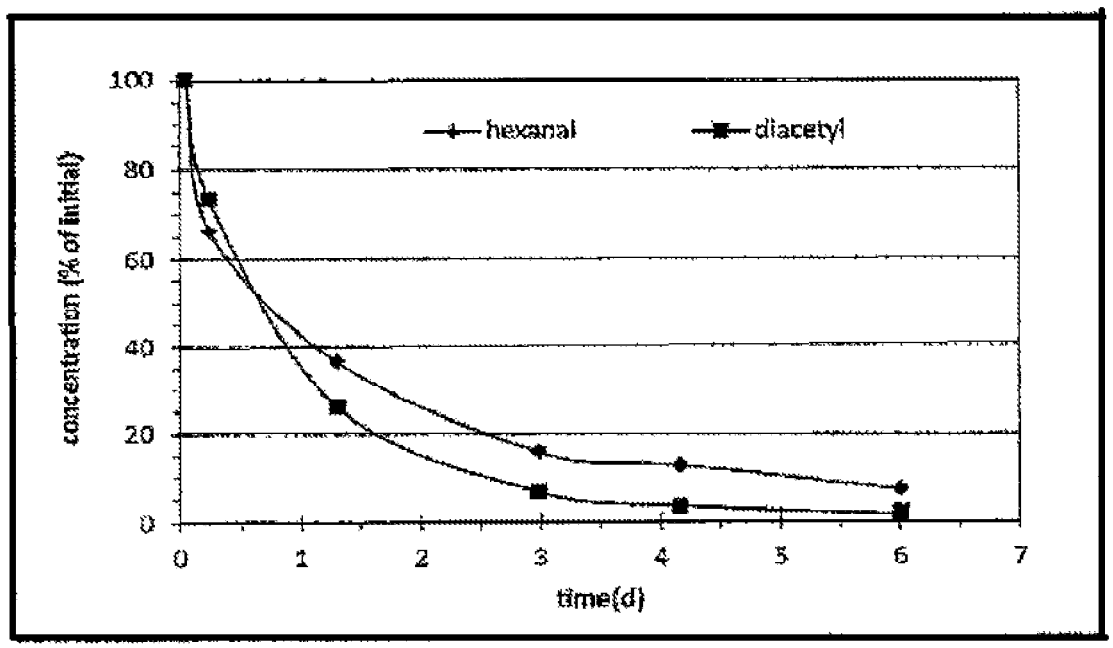
FIG. 3 illustrates concentrations of hexanal and diacetyl (mixture D) in the headspace of glass mason jars containing three cherry tomatoes.

The inhibition of fungal spores or bacteria inoculated on the tomatoes was due to the action of the antimicrobials released in the headspace of the container which were maintained for sufficient periods of time to exert antimicrobial effects. FIG. 3 shows an example wherein concentrations of hexanal and diacetyl from mixture D were measured in the headspace of the Mason jars containing three cherry tomatoes.

We claim:

1. A system for prolonging the shelf life of perishable goods, comprising:
   a hermetically sealed container having an interior compartment for storage of perishable goods,
   a flow of gas minimized between the interior compartment and an environment outside of the container,
   the hermetically sealed container containing a perishable good in its interior compartment, the hermetically sealed container further containing a single antimicrobial binary mixture of volatile compounds derived from essential oils that transition from liquid to vapor phase in its interior compartment,
   the single antimicrobial binary mixture of volatile compounds reaching and sustaining a vapor phase concentration within the interior compartment for a period of time sufficient to kill and inhibit growth of both bacteria and fungi in the interior compartment, the single antimicrobial binary mixture of volatile compounds selected to achieve a lethality and an inhibition of at least one fungal species and at least one bacterial species, the single binary mixture selected from one of:
   hexanal/cinnamaldehyde having vapor phase concentrations of 2-25 ppm for hexanal and 20-210 ppm for cinnamaldehyde;
   hexanal/acetic acid having vapor phase concentrations of 2-25 ppm for hexanal and 2-36 ppm for acetic acid;
   hexanal/diacetyl having vapor phase concentrations of 2-25 ppm for hexanal and 1.0-22 ppm for diacetyl;
   2-nonanone/cinnamaldehyde having vapor phase concentrations of 10-200 ppm for 2-nonanone and 20-210 ppm for cinnamaldehyde;
   2-nonanone/acetic acid having vapor phase concentrations of 10-200 ppm for 2-nonanone and 2-36 ppm for acetic acid;
   allyl isothiocyanate/acetic acid having vapor phase concentrations of 0.2-2.0 ppm for allyl isothiocyanate and 2-36 ppm for acetic acid;
   allyl isothiocyanate/diacetyl having vapor phase concentrations of 0.2-2.0 ppm for allyl isothiocyanate and 1.0-22 ppm for diacetyl;
   thymol/acetic acid having vapor phase concentrations of 3-30 ppm for thymol and 2-36 ppm for acetic acid; or thymol/cinnamaldehyde having vapor phase concentrations of 3-30 ppm for thymol and 20-210 ppm for cinnamaldehyde;

wherein the perishable goods comprise fruits, vegetables, cut flowers, and combinations thereof.

2. The system of claim 1, wherein the one of the binary mixtures is selected according to the lethality and inhibition of one or more fungal species from the group consisting of *Alternaria* alternta, Penicilium olsonii, *Botrytis cinerea, Cladosporium* species, *Rhizopus stolonifer* or *Geotrichum candidum*.

3. The system of claim 1, further comprising selecting the one of the binary mixtures according to the lethality and inhibition of one or more fungal species from the group consisting of *Alternaria* alternta, Penicilium olsonii, *Botrytis cinerea, Cladosporium species, Rhizopus stolonifer* or *Geotrichum candidum*.

4. The system of claim 1, wherein the binary mixture consists essentially of hexanal/cinnamaldehyde having a vapor phase concentration of 2-25 ppm for hexanal and 20-210 ppm for cinnamaldehyde.

5. The system of claim 1, wherein the binary mixture consists essentially of hexanal/acetic acid having a vapor phase concentration of 2-25 ppm for hexanal and 2-36 ppm for acetic acid.

6. The system of claim 1, wherein the binary mixture consists essentially of hexanal/diacetyl having a vapor phase concentration of 2-25 ppm for hexanal and 1.0-22 ppm for diacetyl.

7. The system of claim 1, wherein the binary mixture consists essentially of 2-nonanone/cinnamaldehyde having a vapor phase concentration of 10-200 ppm for 2-nonanone and 20-210 ppm for cinnamaldehyde.

8. The system of claim 1, wherein the binary mixture consists essentially of 2-nonanone/acetic acid having a vapor phase concentration of 10-200 ppm for 2-nonanone and 2-36 ppm for acetic acid.

9. The system of claim 1, wherein the binary mixture consists essentially of allyl isothiocyanate/acetic acid having a vapor phase concentration of 0.2-2.0 ppm for allyli isothiocyanate and 2-36 ppm for acetic acid.

10. The system of claim 1, wherein the binary mixture consists essentially of allyl isothiocyanate/diacetyl having a vapor phase concentration of 0.2-2.0 ppm for allyl isothiocyanate and 1.0-22 ppm for diacetyl.

11. The system of claim 1, wherein the binary mixture consists essentially of thymol/acetic acid having a vapor phase concentration of 3-30 ppm for thymol and 2-36 ppm for acetic acid.

12. The system of claim 1, wherein the binary mixture consists essentially of thymol/cinnamaldehyde having a vapor phase concentration of 3-30 ppm for thymol and 20-210 ppm for cinnamaldehyde.

13. The system of claim 1, wherein the one of the binary mixtures is lethal to and inhibits growth of the at least one bacterial species consisting of *E. coli* 0157:Hl, 1, *E. coli* 0157:Hl, 2, *E. coli* 0157:Hl, 3, *L. monocytogenes*, 1, *L. monocytogenes*, 2, *L. monocytogenes*, 3, *Salmonella* spp., 1 or *Salmonella* spp., 2.

14. The system of claim 2, wherein a lethality index and an inhibition index caused by the binary mixture to the at least one fungal species is at least 3.77 log cfu/cm$^2$ for *Alternaria* alternta, at least 4.40 log cfu/cm$^2$ for Penicilium olsonii, at least 2.26 log cfu/cm$^2$ for *Botrytis cinerea*, at least 4.13 log cfu/cm$^2$ for *Cladosporium* species, at least 4.52 log cfu/cm$^2$ for Rhizopusstolonifer or at least 4.75 log cfu/cm$^2$ for *Geotrichum candidum*.

15. The system of claim 13, wherein a lethality index caused by the binary mixture to the at least one bacterial species is at least 5.5 log cfu/cm$^2$ for *E. coli* 0157:H1, 1, at least 4.6 log cfu/cm$^2$ for *E. coli* 0157.H1, 2, at least 4.0 log cfu/cm$^2$ for *E. coli* 0157:Hl, 3, at least 2.4 log cfu/cm$^2$ for *L. monocytogenes*, 1, at least 3.0 log cfu/cm$^2$ for *L. monocytogenes*,2, at least 2.8 log cfu/cm$^2$ for *L. monocytogenes*, 3, at least 2.5 log cfu/cm$^2$ for *Salmonella* spp., 1 or at least 2.5 log cfu/cm$^2$ for *Salmonella* spp., 2.

16. The system of claim 13, wherein a lethality index caused by the binary mixture to the at least one bacterial species is 5.8 log cfu/cm$^2$ for *E. coli* 0157:Hl, 1, at least 5.6 log cfu/cm$^2$ for *E. coli* 0157:Hl, 2, at least 5.7 log cfu/cm$^2$ for *E. coli* 0157:Hl, 3, at least 6.9 log cfu/cm$^2$ for *L. monocytogenes*, 1, at least 5.8 log cfu/cm$^2$ for *L. monocytogenes*, 2, at least 6.0 log cfu/cm$^2$ for *L. monocytogenes*, 3, at least 5.6 log cfu/cm$^2$ for *Salmonella* spp., 1 or at least 5.4 log cfu/cm$^2$ for *Salmonella* spp., 2.

17. The system of claim 15, wherein the fresh produce is a tomato and the binary mixture is selected from the group consisting of allyl isothiocyanate/diacetyl and hexanal/diacetyl.

* * * * *